US012298505B2

(12) United States Patent
Bhakta et al.

(10) Patent No.: US 12,298,505 B2
(45) Date of Patent: May 13, 2025

(54) OPTICAL SYSTEMS HAVING ANGLE-SELECTIVE TRANSMISSION FILTERS

(71) Applicant: Apple Inc., Cupertino, CA (US)

(72) Inventors: Vikrant Bhakta, Santa Clara, CA (US); Byron R. Cocilovo, Sunnyvale, CA (US); Guolin Peng, Sunnyvale, CA (US); Hyungryul Choi, San Jose, CA (US); Scott M. DeLapp, San Diego, CA (US); Se Baek Oh, Millbrae, CA (US)

(73) Assignee: Apple Inc., Cupertino, CA (US)

( * ) Notice: Subject to any disclaimer, the term of this patent is extended or adjusted under 35 U.S.C. 154(b) by 938 days.

(21) Appl. No.: 17/161,469

(22) Filed: Jan. 28, 2021

(65) Prior Publication Data

US 2021/0247610 A1    Aug. 12, 2021

Related U.S. Application Data

(60) Provisional application No. 62/970,800, filed on Feb. 6, 2020.

(51) Int. Cl.
*G02B 27/01* (2006.01)
*F21V 8/00* (2006.01)
(Continued)

(52) U.S. Cl.
CPC ....... *G02B 27/0172* (2013.01); *G02B 5/1814* (2013.01); *G02B 5/203* (2013.01);
(Continued)

(58) Field of Classification Search
CPC ............ G02B 27/0172; G02B 27/0103; G02B 27/4205–4216; G02B 27/4244;
(Continued)

(56) References Cited

U.S. PATENT DOCUMENTS

| 6,750,996 B2 * | 6/2004 | Jagt ...................... G02B 6/0056 359/34 |
| 10,234,686 B2 | 3/2019 | Vallius |

(Continued)

FOREIGN PATENT DOCUMENTS

| CN | 1559000 A | 12/2004 |
| CN | 104380157 A | 2/2015 |

(Continued)

*Primary Examiner* — Jyotsna V Dabbi
(74) *Attorney, Agent, or Firm* — Treyz Law Group, P.C.; Michael H. Lyons; Jinie M. Guihan (57) ABSTRACT

An electronic device may include an emissive display panel that emits light. The light may propagate along an optical path extending to an eye box. A waveguide with an input coupler and an output coupler may be interposed on the optical path. An angle-selective transmission filter (ASTF) may be interposed on the optical path and may filter the emitted light as a function of angle to remove high-angle light from the optical path before the light is provided to the output coupler. The ASTF may include diffractive grating structures such as thin-film holograms, volume holograms, or surface relief gratings, louvered mirrors, multi-layer coatings, or a pinhole array. This ASTF may serve to minimize stray light within the display, thereby optimizing the contrast and the modulation transfer function (MTF) of the display.

24 Claims, 6 Drawing Sheets

(51) Int. Cl.
*G02B 5/18* (2006.01)
*G02B 5/20* (2006.01)
*G02B 5/22* (2006.01)
*G02B 5/26* (2006.01)
*G02B 5/32* (2006.01)

(52) U.S. Cl.
CPC .............. *G02B 5/22* (2013.01); *G02B 5/26* (2013.01); *G02B 5/32* (2013.01); *G02B 6/0016* (2013.01); *G02B 6/0023* (2013.01); *G02B 6/0026* (2013.01); *G02B 6/0035* (2013.01); *G02B 2027/012* (2013.01); *G02B 2027/0174* (2013.01)

(58) Field of Classification Search
CPC .... G02B 2027/0105; G02B 2027/0107; G02B 2027/0112; G02B 2027/012; G02B 2027/0123; G02B 2027/0125; G02B 2027/0174; G02B 5/1814; G02B 5/1819; G02B 5/1823; G02B 5/203; G02B 5/22; G02B 5/26; G02B 5/32; G02B 6/0016; G02B 6/0023; G02B 6/0026; G02B 6/0035; G03H 1/0005; G03H 1/024–0256
USPC ........................................ 359/1, 13, 15, 34
See application file for complete search history.

(56) References Cited

U.S. PATENT DOCUMENTS

| | | | |
|---|---|---|---|
| 10,274,660 | B2 | 4/2019 | Dimov et al. |
| 10,330,937 | B2 | 6/2019 | Cheng et al. |
| 10,338,388 | B2 | 7/2019 | Hirano et al. |
| 10,338,400 | B2 | 7/2019 | Connor |
| 10,747,001 | B2 | 8/2020 | Schultz et al. |
| 2013/0278631 | A1* | 10/2013 | Border ............... G06F 3/04842 345/633 |
| 2018/0084232 | A1 | 3/2018 | Belenkii et al. |
| 2019/0146221 | A1* | 5/2019 | Oku .................. G02B 27/0172 359/13 |
| 2019/0212557 | A1* | 7/2019 | Waldern ............ G02B 27/0179 |
| 2020/0089319 | A1 | 3/2020 | Popovich et al. |
| 2020/0225471 | A1* | 7/2020 | Waldern ............ G02B 27/0103 |

FOREIGN PATENT DOCUMENTS

| | | |
|---|---|---|
| CN | 104950442 A | 9/2015 |
| CN | 107003528 A | 8/2017 |
| CN | 107533228 A | 1/2018 |
| CN | 108292042 A | 7/2018 |
| CN | 108474945 A | 8/2018 |
| WO | 2019187332 A1 | 10/2019 |
| WO | 2020205101 A1 | 10/2020 |
| WO | WO-2020256769 A1 * 12/2020 ......... G02B 27/0172 |

\* cited by examiner

OPTICAL SYSTEMS HAVING ANGLE-SELECTIVE TRANSMISSION FILTERS

This application claims the benefit of U.S. Provisional Application No. 62/970,800, filed Feb. 6, 2020, which is hereby incorporated by reference herein in its entirety.

BACKGROUND

This relates generally to optical systems and, more particularly, to optical systems for displays.

Electronic devices may include displays that present images close to a user's eyes. For example, devices such as virtual reality and augmented reality headsets may include displays with optical elements that allow users to view the displays.

It can be challenging to design devices such as these. If care is not taken, the components used in displaying content may be unsightly and bulky and may not exhibit desired levels of optical performance.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The near-eye display may include an emissive display panel having an array of pixels that emit light. The emitted light may propagate along an optical path extending from the emissive display panel towards an eye box. A waveguide may be interposed on the optical path. An input coupler may couple the light into the waveguide. An output coupler may couple the light out of the waveguide and towards the eye box. Imaging optics may direct the light towards the input coupler. A prism may direct the light from the emissive display panel towards the imaging optics. The prism may combine light from multiple emissive display panels.

An angle-selective transmission filter (ASTF) may be interposed on the optical path at one or more locations. For example, the ASTF may be interposed between one or more of the emissive display panels and the prism, between the prism and the imaging optics, between the imaging optics and the input coupler, or within the waveguide. The ASTF may filter the emitted light as a function of angle to produce filtered light. For example, the ASTF may transmit a first portion of the emitted light (e.g., as the filtered light) along the optical path and may re-direct a second portion of the emitted light outside of the optical path. The first portion of the emitted light may span a first set of incident angles relatively close to a normal axis of the ASTF. The second portion of the emitted light may be high angle light that spans a second set of incident angles farther from the normal axis than the first portion of the emitted light.

The ASTF may include diffractive grating structures such as thin-film holograms, volume holograms (e.g., thin or thick volume holograms), or surface relief gratings, louvered mirrors, multi-layer coatings, or a pinhole array, as examples. The diffractive gratings may transmit the first portion of the emitted light while diffracting the second portion of the emitted light out of the optical path. The diffractive gratings may include many gratings (e.g., formed in separate media layers or multiplexed within one or more of the same media layers) to diffract as much of the second portion of light as possible. The ASTF may re-direct (e.g., diffract) the second portion of the emitted light within a light cone associated with the first portion of the light, towards an absorber (e.g., via total internal reflection within an additional waveguide), or elsewhere outside of the optical path. This may serve to minimize stray light within the display, thereby optimizing the contrast and the modulation transfer function (MTF) of the display.

DETAILED DESCRIPTION

Figure 1:
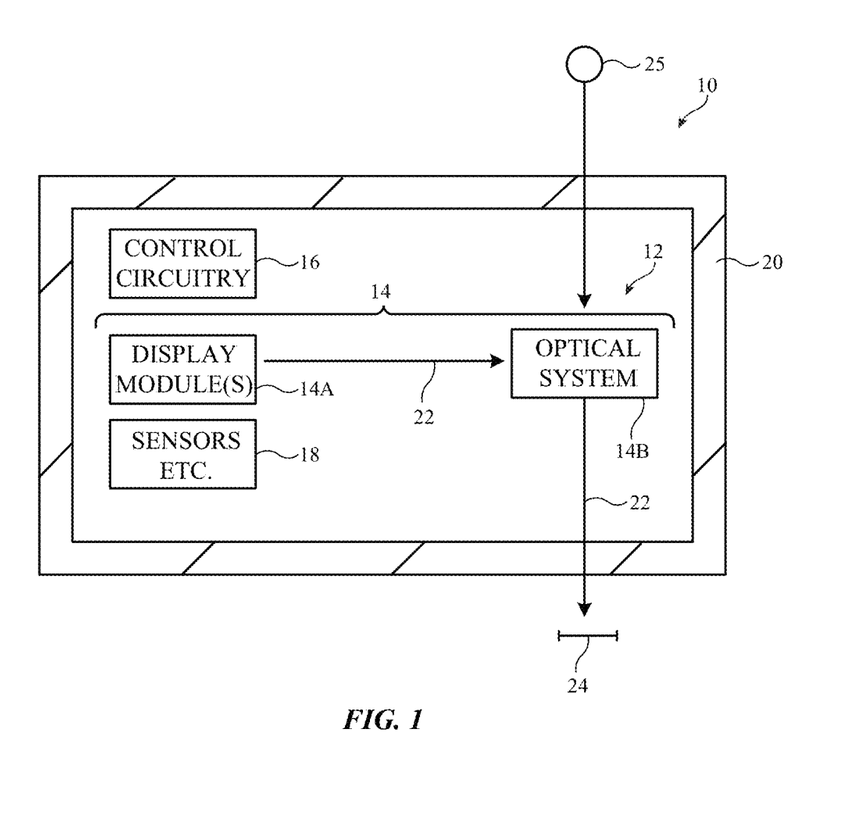
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 14 mounted within support structure (housing) 20. Support structure 20 may have the shape of a pair of eyeglasses (e.g., supporting frames), may form a housing having a helmet shape, or may have other configurations to help in mounting and securing the components of near-eye displays 14 on the head or near the eye of a user. Near-eye displays 14 may include one or more display modules such as display modules 14A and one or more optical systems such as optical systems 14B. Display modules 14A may be mounted in a support structure such as support structure 20. Each display module 14A may emit light 22 (image light) that is redirected towards a user's eyes at eye box 24 using an associated one of optical systems 14B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code (instructions) may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.). In one suitable arrangement that is sometimes described herein as an example, components 18 may include gaze tracking sensors that gather gaze image data from a user's eye at eye box 24 to track the direction of the user's gaze in real time. As an example, the gaze tracking sensors may include infrared or other light emitters that emit infrared light or other light towards the eye box and image sensors that sense the infrared or other light reflected off of the user's eye (e.g., where the sensed light identifies the gaze direction of the user's eye).

Display modules 14A may include reflective displays (e.g., liquid crystal on silicon (LCOS) displays, digital-micromirror device (DMD) displays, or other spatial light modulators), emissive displays (e.g., micro-light-emitting diode (uLED) displays, organic light-emitting diode (OLED) displays, laser-based displays, etc.), or displays of other types. Light sources in display modules 14A may include uLEDs, OLEDs, LEDs, lasers, combinations of these, or any other desired light-emitting components. Arrangements in which display modules 14A include emissive displays having emissive display panels are described herein as an example.

Optical systems 14B may form lenses that allow a viewer (see, e.g., a viewer's eyes at eye box 24) to view images on display(s) 14. There may be two optical systems 14B (e.g., for forming left and right lenses) associated with respective left and right eyes of the user. A single display 14 may produce images for both eyes or a pair of displays 14 may be used to display images. In configurations with multiple displays (e.g., left and right eye displays), the focal length and positions of the lenses formed by components in optical system 14B may be selected so that any gap present between the displays will not be visible to a user (e.g., so that the images of the left and right displays overlap or merge seamlessly).

If desired, optical system 14B may contain components (e.g., an optical combiner, etc.) to allow real-world image light from real-world images or objects 25 to be combined optically with virtual (computer-generated) images such as virtual images in image light 22. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement which a camera captures real-world images of object 25 and this content is digitally merged with virtual content at optical system 14B).

System 10 may, if desired, include wireless circuitry and/or other circuitry to support communications with a computer or other external equipment (e.g., a computer that supplies display 14 with image content). During operation, control circuitry 16 may supply image content to display 14. The content may be remotely received (e.g., from a computer or other content source coupled to system 10) and/or may be generated by control circuitry 16 (e.g., text, other computer-generated content, etc.). The content that is supplied to display 14 by control circuitry 16 may be viewed by a viewer at eye box 24.

Figure 2:
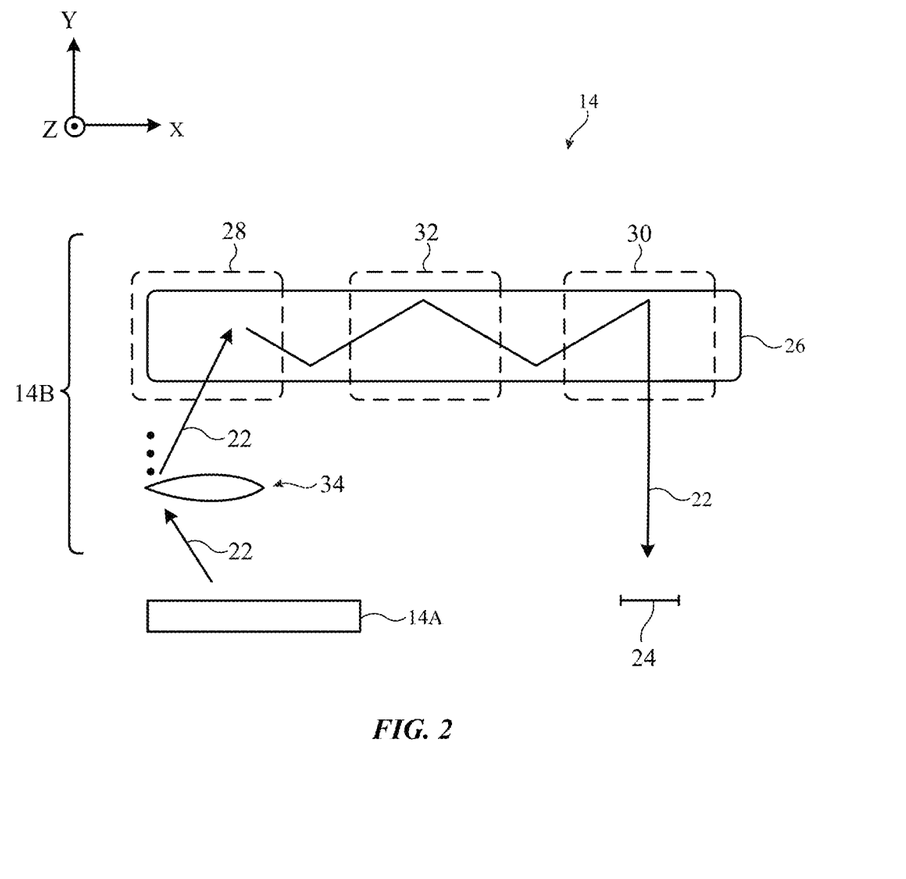
FIG. 2 is a top view of an illustrative optical system for a display having a waveguide with an input coupler and an output coupler in accordance with some embodiments.

FIG. 2 is a top view of an illustrative display 14 that may be used in system 10 of FIG. 1. As shown in FIG. 2, near-eye display 14 may include one or more display modules such as display module 14A and an optical system such as optical system 14B. Optical system 14B may include optical elements such as one or more waveguides 26. Waveguide 26 may include one or more stacked substrates (e.g., stacked planar and/or curved layers sometimes referred to herein as waveguide substrates) of optically transparent material such as plastic, polymer, glass, etc.

If desired, waveguide 26 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 26 may include holographic phase gratings such as volume holograms or thin-film holograms, meta-gratings, or any other desired diffractive grating structures. The diffractive gratings on waveguide 26 may also include surface relief gratings formed on one or more surfaces of the substrates in waveguides 26, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles) or overlapping gratings that are formed in respective layers of grating media.

Optical system 14B may include collimating optics such as imaging optics 34. Imaging optics 34 (sometimes referred to herein as imaging lens 34) may include one or more lens elements that help direct image light 22 towards waveguide 26. If desired, display module 14A may be mounted within support structure 20 of FIG. 1 while optical system 14B may be mounted between portions of support structure 20 (e.g., to form a lens that aligns with eye box 24). Other mounting arrangements may be used, if desired.

As shown in FIG. 2, display module 14A may generate light 22 associated with image content to be displayed to eye box 24. Light 22 may be collimated using a lens such as a lens in imaging optics 34. Optical system 14B may be used to present light 22 output from display module 14A to eye box 24.

Optical system 14B may include one or more optical couplers such as input coupler 28, cross-coupler 32, and output coupler 30. In the example of FIG. 2, input coupler 28, cross-coupler 32, and output coupler 30 are formed at or on waveguide 26. Input coupler 28, cross-coupler 32, and/or output coupler 30 may be completely embedded within the substrate layers of waveguide 26, may be partially embedded within the substrate layers of waveguide 26, may be mounted to waveguide 26 (e.g., mounted to an exterior surface of waveguide 26), etc.

The example of FIG. 2 is merely illustrative. One or more of these couplers (e.g., cross-coupler 32) may be omitted. Optical system 14B may include multiple waveguides that are laterally and/or vertically stacked with respect to each other. Each waveguide may include one, two, all, or none of couplers 28, 32, and 30. Waveguide 26 may be at least partially curved or bent if desired.

Waveguide 26 may guide light 22 down its length via total internal reflection. Input coupler 28 may be configured to couple light 22 from display module 14A (imaging optics 34) into waveguide 26, whereas output coupler 30 may be configured to couple light 22 from within waveguide 26 to the exterior of waveguide 26 and towards eye box 24. For example, display module 14A may emit light 22 in direction +Y towards optical system 14B. When light 22 strikes input coupler 28, input coupler 28 may redirect light 22 so that the light propagates within waveguide 26 via total internal reflection towards output coupler 30 (e.g., in direction X). When light 22 strikes output coupler 30, output coupler 30 may redirect light 22 out of waveguide 26 towards eye box 24 (e.g., back along the Y-axis). In scenarios where cross-coupler 32 is formed at waveguide 26, cross-coupler 32 may redirect light 22 in one or more directions as it propagates down the length of waveguide 26, for example.

Input coupler 28, cross-coupler 32, and/or output coupler 30 may be based on reflective and refractive optics or may be based on holographic (e.g., diffractive) optics. In arrangements where couplers 28, 30, and 32 are formed from reflective and refractive optics, couplers 28, 30, and 32 may include one or more reflectors (e.g., an array of micromirrors, partial mirrors, or other reflectors). In arrangements where couplers 28, 30, and 32 are based on holographic optics, couplers 28, 30, and 32 may include diffractive gratings (e.g., volume holograms, surface relief gratings, etc.).

In practice, light is emitted by each pixel in display module 14A over a corresponding range of angles (e.g., within a corresponding light cone). If care is not taken, light emitted by the pixels in display module 14A at relatively high (wide) angles may not properly couple into waveguide 26 and may undesirably propagate through display 14 as stray light. This may limit contrast in the images provided to eye box 24 and may reduce the modulation transfer function (MTF) of the system. In order to mitigate these effects, display 14 may include one or more angle-selective transmission filters that filter out light emitted by the pixels in display module 14A at relatively high angles.

Figure 3:
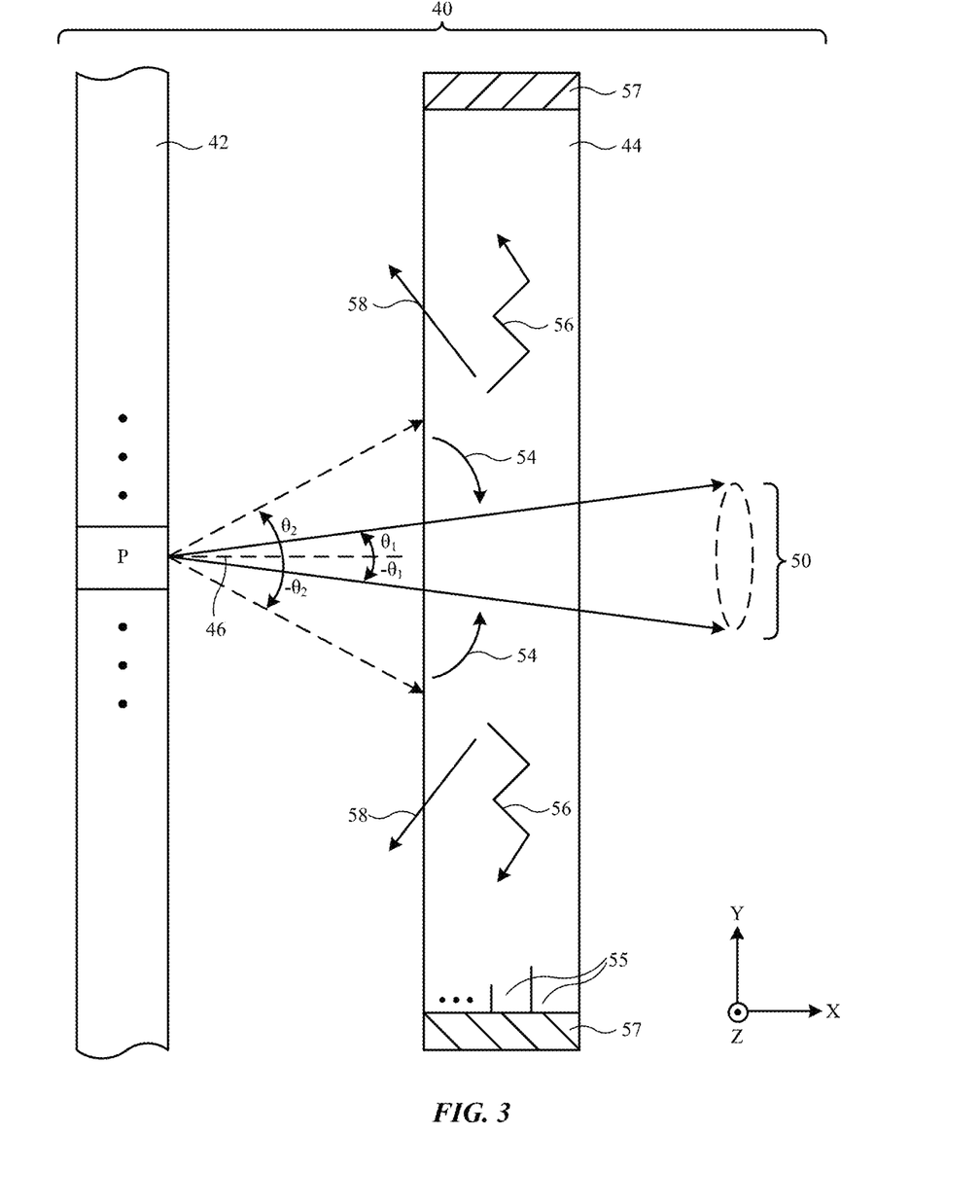
FIG. 3 is a top view of an illustrative angle-selective transmission filter for an emissive display panel in accordance with some embodiments.

FIG. 3 is a diagram of an illustrative angle-selective transmission filter that may be used in display 14. As shown in FIG. 3, optical path 40 (e.g., the optical path extending from display module 14A to eye box 24 of FIG. 2) may include a display panel such as emissive display panel 42 (e.g., an emissive display panel in display module 14A of FIG. 2). Optical path 40 may also include an angle-selective transmission filter such as angle-selective transmission filter (ASTF) 44. ASTF 44 may be optically interposed within optical path 40 between emissive display panel 42 and eye box 24 (FIG. 2).

Emissive display panel 42 may include an array of light sources such as display pixels P. Display pixels P may, for example, be formed using micro-light-emitting diodes (uLEDs), organic light-emitting diodes (OLEDs), light-emitting diodes (LEDs), lasers (e.g., vertical-cavity surface-emitting lasers), or any other desired emissive light sources. Each pixel P emits light over a range of display panel output angles θ relative to the normal axis 46 of emissive display panel 42 (e.g., within a corresponding light cone from angle $-\theta_2$ to angle $\theta_2$ with respect to normal axis 46). This light may, for example, form part of image light 22 of FIG. 2.

In practice, only light emitted by pixels P within a particular range of angles relatively close to normal axis 46 will be properly coupled into waveguide 26 for display at eye box 24 (FIG. 2). In the example of FIG. 3, light emitted by pixels P within the relatively narrow range of angles from angle $-\theta_1$ to angle $\theta_1$ can be satisfactorily coupled into waveguide 26 (e.g., within light cone 50). However, light emitted by pixels P at wider angles (e.g., light from angle $-\theta_2$ to angle $-\theta_1$ and light from angle $\theta_2$ to angle $\theta_1$) may be unsuitable for satisfactory coupling into waveguide 26. If care is not taken, this light may propagate through display 14 as stray light, undesirably limiting contrast and MTF for the system.

To mitigate these issues. ASTF 44 may filter out the light emitted by pixels P at these wide angles (e.g., from angle $-\theta_2$ to angle $-\theta_1$ and from angle $\theta_2$ to angle $\theta_1$), while also transmitting the light emitted by pixels P at angles that are suitable for satisfactory coupling into waveguide 26 (e.g., from angle $-\theta_1$ to angle $-\theta_1$). In other words, ASTF 44 may filter the light emitted by each pixel P as a function of the angle. ASTF 44 may include diffractive grating structures such as volume holograms (e.g., thick volume holograms or thin volume holograms), thin film holograms, or surface relief gratings, louvered mirrors, multi-layer coatings, and/or pinhole (micro-aperture) arrays. These structures may be configured to direct the light received by ASTF 44 at any desired angles (e.g., wide angles from angle $-\theta_2$ to angle $-\theta_1$ and from angle $\theta_2$ to angle $\theta_1$) out of optical path 40 while also (concurrently) transmitting light received by ASTF 44 at other desired angles (e.g., narrow angles from angle $-\theta_1$ to angle $\theta_1$). $\theta_1$ may be 10 degrees, 12 degrees, 15 degrees, 20 degrees, 8 degrees, 8-20 degrees. 10-20 degrees, 10-15 degrees, 5-25 degrees, 10-30 degrees, more than 5 degrees, less than 45 degrees, or any other desired angle. ASTF 44 may include one or more filter layers 55. Filter layers 55 may each be formed from a respective coating, waveguide substrate (e.g., a planar or curved waveguide substrate), layer of grating medium, layer of grating medium and corresponding waveguide substrate, and/or layer of grating medium sandwiched by a corresponding pair of waveguide substrates, as examples.

ASTF 44 may, for example, re-direct light from angle $-\theta_2$ to angle $-\theta_1$ and light from angle $\theta_2$ to angle $\theta_1$ to angles within light cone 50, as shown by arrows 54. For example, diffractive grating structures within ASTF 44 may be configured to diffract (e.g., may be Bragg matched to) the light emitted by pixels P from angle $-\theta_2$ to angle $-\theta_1$ and from angle $\theta_2$ to angle $\theta_1$ (e.g., light incident upon ASTF 44 at incident angles from 90 degrees $-\theta_2$ to 90 degrees $-\theta_1$ with respect to the normal axis of ASTF 44, e.g., axis 46) onto output angles that lie within light cone 50 (e.g., output angles from $-_1$ to $\theta 1$).

In another suitable arrangement, ASTF 44 may, for example, re-direct light from angle $-\theta_2$ to angle $-\theta_1$ and light from angle $\theta_2$ to angle $\theta_1$ towards a light absorber such as light absorbers 57, as shown by arrows 56. In this example, ASTF 44 may output the light received from angle $-\theta_2$ to angle $-\theta_1$ and from angle $\theta_2$ to angle $\theta_1$ at output angles such that the re-directed light propagates down one or more filter layers 55 of ASTF 44 (e.g., waveguide substrates) via total internal reflection until the light reaches absorbers 57. For example, diffractive grating structures within ASTF 44 may be configured to diffract (e.g., may be Bragg matched to) the light emitted by pixels P from angle $-\theta_2$ to angle $-\theta_1$ and from angle $\theta_2$ to angle $\theta_1$ (e.g., light incident upon ASTF at incident angles from 90 degrees $-\theta_2$ to 90 degrees $-\theta_1$ with respect to the normal axis of ASTF 44) onto output angles that are within the range of angles supported by the total internal reflection modes of filter layers 55. Absorbers 57 may absorb or extinguish this light to prevent stray light from propagating through the system. In this arrangement, if desired, ASTF 44 may include two filter layers 55 each formed from a respective waveguide. Diffraction gratings in one waveguide may direct the light towards absorbers 57 horizontally (e.g., in the +Y and −Y directions) whereas diffraction gratings in the other waveguide direct the light towards absorbers 57 vertically (e.g., in the +Z and −Z directions). This is merely illustrative and, in general, ASTF 44 may include any desired number of waveguides for directing the light in any desired directions.

In yet another suitable arrangement, ASTF 44 may include mirror structures (e.g., louvered mirrors or a holomirror formed from diffractive gratings such as volume holograms or thin film holograms) or other light re-directing structures. These structures may re-direct light from angle −θ2 to angle −θ1 and light from angle θ2 to angle θ1 to output angles outside of optical path 40 such as back toward emissive display panel 42, as shown by arrows 58. This light may be absorbed by absorbers (not shown in FIG. 3 for the sake of clarity) or otherwise removed from optical path 40. For example, diffractive grating structures within ASTF 44 may be configured to diffract (e.g., may be Bragg matched to) the light emitted by pixels P from angle −θ2 to angle −θ1 and from angle θ2 to angle θ1 (e.g., light incident upon ASTF 44 at incident angles from 90 degrees −θ2 to 90 degrees −θ1 with respect to the normal axis of ASTF 44) onto output angles that are outside of optical path 40 (e.g., away from waveguide 26 of FIG. 2). In other words, holograms in the grating structures may be characterized by grating vectors that are oriented such that any light beyond |θ1| from axis 46 is diffracted to some arbitrary output angle that removes that light from optical path 40. The diffractive grating structures may, for example, be written such that the grating vectors of the grating structures are perpendicular to the lateral surface of ASTF 44 (e.g., parallel to axis 46). When configured in this way, ASTF 44 may redirect upward propagating light downwards and may redirect downward propagating light upwards. The grating structures may include multiple gratings to ensure that the full angular range is diffracted.

These arrangements are merely illustrative and may be combined if desired. ASTF 44 may filter the light emitted by pixels P in a single dimension (e.g., within the X-Y plane as shown in FIG. 3) or in multiple dimensions (e.g., in the X-Y and Y-Z planes). In examples where ASTF 44 includes diffractive grating structures such as volume holograms or thin film holograms, each grating (e.g., each hologram) may be Bragg matched to a corresponding range of input angles and a corresponding range of wavelengths. In other words, each grating diffracts light received at its corresponding range of input angles and range of wavelengths to a respective range of output angles. The range of output angles may lie within light cone 50 (e.g., ASTF 44 may re-direct wide angle light into light cone 50 as shown by arrows 54), may lie within the range of angles that support total internal reflection within ASTF 44 (e.g., ASTF 44 may re-direct wide angle light towards absorbers 57 by total internal reflection as shown by arrows 56), or may include any other desired angles outside of optical path 40 (e.g., as shown by arrows 58).

ASTF 44 may include multiple gratings (holograms) that each diffract light at different ranges of incident angles to ensure that light from the entire range of wide angles (e.g., from angle $-\theta_2$ to angle $-\theta_1$ and light from angle $\theta_2$ to angle $\theta_1$) is re-directed in a desired direction. Similarly, ASTF 44 may include multiple gratings (holograms) that each diffract light at different ranges of wavelengths to ensure that light from the entire range of wavelengths emitted by pixels P is re-directed in a desired direction. If desired, these gratings may each be formed in respective grating medium layers (e.g., filter layers 55) of ASTF 44 (e.g., where each of the gratings spatially overlap the other gratings in ASTF 44), and/or two or more of these gratings (e.g., all of the gratings) may be multiplexed within the same grating medium layer (e.g., filter layer 55) of ASTF 44 (e.g., where the two or more gratings are recorded and thus superimposed within the same volume of grating medium).

As one example, the gratings in ASTF 44 may include one or more gratings that diffract red light, one or more gratings that diffract green light, and/or one or more gratings that diffract blue light. The gratings that diffract red light may be formed in a first filter layer 55 (e.g., a first layer of grating medium), the gratings that diffract green light may be formed in a second filter layer 55 (e.g., a second layer of grating medium), and the gratings that diffract blue light may be formed in a third filter layer 55 (e.g., a third layer of grating medium), as an example. In another suitable arrangement, each of the gratings may be formed in a single layer that is optimized to diffract white light (e.g., a single layer that includes gratings that diffract red light, gratings that diffract green light, and gratings that diffract blue light). Combinations of these arrangements may be used if desired. These examples are merely illustrative. Any desired wavelength ranges or colors may be used. Pixels P may emit infrared or ultraviolet light if desired. While ASTF 44 is shown as being spaced apart (e.g., separated) from emissive display panel 42 in FIG. 3, this is merely illustrative. If desired, ASTF 44 may be mounted to (e.g., in direct contact with) the lateral surface of emissive display panel 42.

Figure 4:
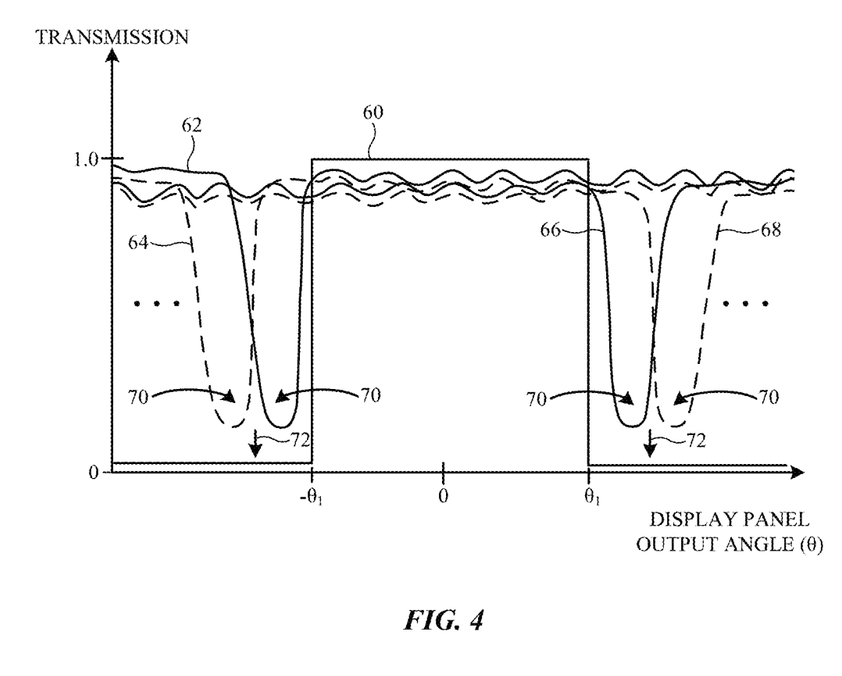
FIG. 4 is a plot of transmission as a function of display panel output angle showing effects of an illustrative angle-selective transmission filter on light emitted by an emissive display panel in accordance with some embodiments.

FIG. 4 is a diagram showing how ASTF 44 may affect the transmission profile for emissive display panel 42. As shown in FIG. 4, curve 60 plots the ideal transmission of light through ASTF 44 as a function of display panel output angle θ. While FIG. 4 plots only a single dimension for the sake of clarity (e.g., ASTF 44 may filter light over a single dimension), in general, ASTF 44 may filter light over two dimensions if desired. As shown by curve 60, ASTF 44 ideally transmits all light from angle $-\theta_1$ to angle $\theta_1$ and does not transmit any light greater than angle $\theta_1$ or less than angle $-\theta_1$. This will prevent any light at wide angles from propagating through display 14 as stray light. By including multiple gratings (holograms) within ASTF 44, the actual transmission profile for ASTF 44 may approximate curve 60.

Consider an example in which ASTF 44 includes multiple stacked holograms (e.g., thin holograms each formed in a respective filter layer 55). This may serve to increase the diffraction efficiency of the holograms relative to scenarios where the holograms are all multiplexed in the same volume of grating medium (e.g., within the same filter layer 55). Each hologram may be Bragg matched to a respective range of angles θ. In the example of FIG. 4. ASTF 44 includes four holograms that are each matched to a respective range of angles θ. For example, ASTF 44 may include a first hologram associated with curve 62, a second hologram associated with curve 64, a third hologram associated with curve 66, and a fourth hologram associated with curve 68. Each hologram diffracts light incident at a respective range of angles θ, as shown by response minima 70 of curves 62, 64, 66, and 68. Light at these ranges of angles is removed from optical path 40 and are not transmitted to waveguide 26 (or are transmitted to waveguide 26 at output angles from $-\theta_1$ to $\theta_1$, as shown by arrows 54 of FIG. 3). By increasing the number of holograms in ASTF 44, the transmission response of ASTF 44 may closely approximate curve 60 and nearly all of the light emitted by pixels P at angles greater than $\theta_1$ and less than $-\theta_1$ may be filtered out of the optical path. If desired, the thicknesses of each layer 55 may also be increased to further decrease minima 70, as shown by arrows 72. The example of FIG. 4 is merely illustrative. Curves 60, 62, 64, 66, and 68 may have other shapes. The example of FIG. 4 corresponds to light of a single wavelength range for the sake of simplicity. In practice, additional holograms may be used to diffract light at these incident angles but for other wavelength ranges (e.g., to ensure that wide angle light of each wavelength emitted by pixels P is filtered from the optical path). ASTF 44 may include any desired number of holograms.

Figure 5:
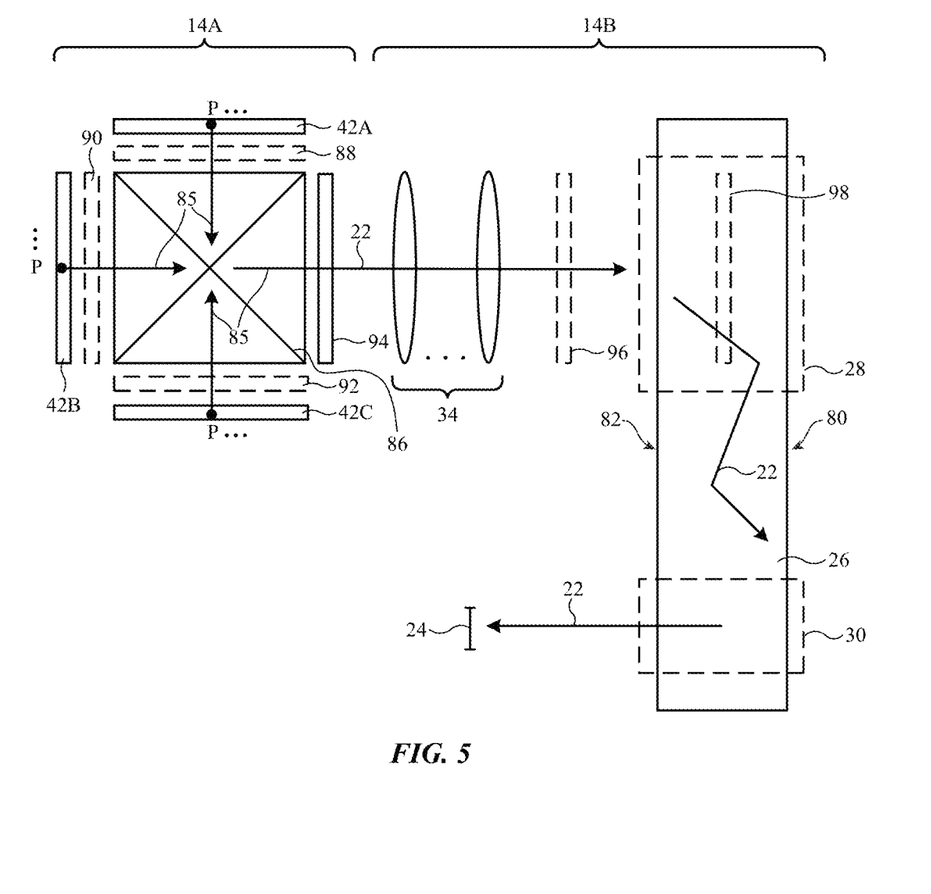
FIG. 5 is a diagram of an illustrative optical system having emissive display panels and one or more angle-selective transmission filters in accordance with some embodiments.

FIG. 5 is a diagram showing illustrative locations at which ASTF 44 may be formed within display 14. As shown in FIG. 5, display 14 may include display module 14A (sometimes referred to herein as illumination optics 14A) and optical system 14B. Display module 14A may include one or more emissive display panels 42 and prism 86. Emissive display panels 42 may include arrays of emissive light sources (e.g., pixels P) such as LEDs, OLEDs, uLEDs, lasers, etc. Emissive display panels 42 in display module 14A may, for example, include a first emissive display panel 42A, a second emissive display panel 42B, and a third emissive display panel 42C. Emissive display panels 42A, 42B, and 42C may each emit illumination light 85 of a corresponding wavelength range (e.g., color). For example, emissive display panel 42A may emit red light, emissive display panel 42B may emit green light, and emissive display panel 42C may emit blue light. This is merely illustrative and, in general, emissive display panels 42 may each emit light in any desired number of wavelength ranges. Prism 86 may combine the light emitted by emissive display panels 42A, 42B, and 42C into light 22 (e.g., light 22 may include red, green, and blue light, etc.).

Light 22 is directed (e.g., collimated) towards waveguide 26 by imaging optics 34. Input coupler 28 at waveguide 26 couples light 22 into waveguide 26. Light 22 propagates down the length of waveguide 26 via total internal reflection. Output coupler 30 couples light 22 out of waveguide 26 and towards eye box 24. Angle-selective transmission filters such as ASTF 44 of FIG. 3 may be formed at one or more desired locations in display 14.

If desired, angle-selective transmission filters such as ASTF 44 may be located between one or more of emissive display panels 42A and prism 86. For example, ASTF 44 may be mounted at location 88 between emissive display panel 42A and prism 86, at location 90 between emissive display panel 42B and prism 86, and/or at location 92 between emissive display panel 42A and prism 86. ASTF 44 (e.g., locations 88, 90, and 92) may be spaced apart from emissive display panels 42, may be in direct contact with corresponding emissive display panels, may be spaced apart from prism 86, and/or may be in direct contact with prism 86. The filters may filter out wide-angle light emitted by pixels P from illumination light 85 prior to transmitting the illumination light to prism 86.

If desired, an angle-selective transmission filter such as ASTF 44 may be mounted at location 94 between prism 86 and imaging optics 34. ASTF 44 (e.g., location 94) may be spaced apart from prism 86, may be in direct contact with prism 86, may be spaced apart from imaging optics 34, and/or may be in direct contact with imaging optics 34. The filter may filter out wide-angle light from light 22 prior to transmitting the light to imaging optics 34.

If desired, an angle-selective transmission filter such as ASTF 44 may be mounted at location 96 between imaging optics 34 and input coupler 28 of waveguide 26. ASTF 44 (e.g., location 96) may be spaced apart from imaging optics 34, may be in direct contact with imaging optics 34, may be spaced apart from input coupler 28, and/or may be in direct contact with input coupler 28. The filter may filter out wide-angle light from light 22 prior to transmitting the light to input coupler 28.

If desired, an angle-selective transmission filter such as ASTF 44 may be mounted at location 98 on waveguide 26 (e.g., overlapping input coupler 28). Location 98 may be within waveguide 26, at surface 82 of waveguide 26, or at surface 80 of waveguide 26. The filter may filter out wide-angle light from light 22 prior to transmitting the light to output coupler 30. Input coupler 28 may include a reflective input coupling prism or a transmissive input coupling prism, as two examples. Display 14 may include angle-selective transmission filters such as ASTF 44 of FIG. 3 at any desired combination of one or more of locations 88, 90, 92, 94, 96, and 98 of FIG. 5. Display 14 may be provided with other optical arrangements if desired. Other optical components (e.g., polarizers, lenses, filters, beam splitters, prisms, etc.) may be included in display module 14A and/or optical system 14B if desired.

Figure 6:
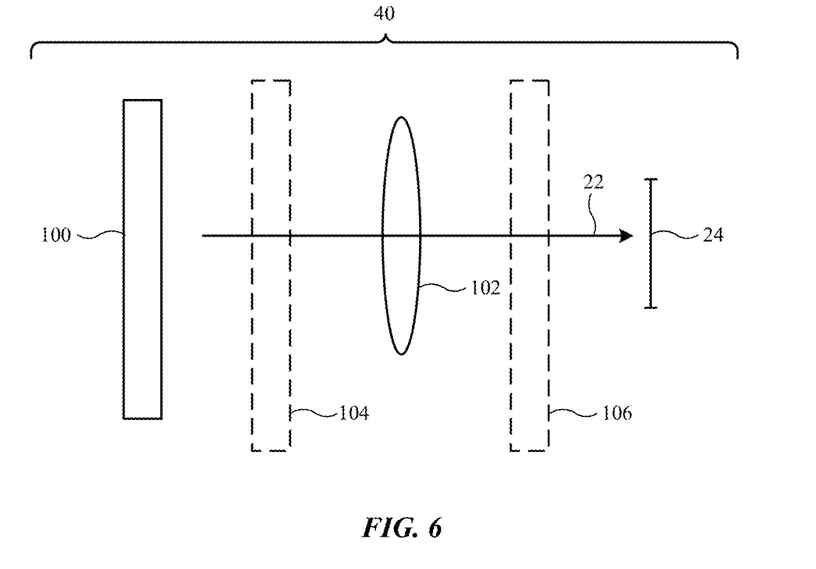
FIG. 6 is a diagram of an illustrative optical path that includes an angle-selective transmission filter and that is free from optical waveguides in accordance with some embodiments.

The examples described above in which optical path 40 includes waveguide 26 is merely illustrative. If desired, waveguide 26 may be omitted from optical path 40. FIG. 6 is a diagram showing how optical path 40 may be free from waveguide 26. As shown in FIG. 6, optical path 40 may extend from light sources 100 to eye box 24. Light sources 100 may include emissive light sources (e.g., emissive display panel 42), light sources that transmit illumination light through a transmissive spatial light modulator (e.g., an LCD panel), and/or light sources that provide illumination light that reflects off of a reflective spatial light modulator (e.g., an LCOS panel or a DMD panel) to produce light 22 for eye box 24. Optical path 40 may include optics 102 (e.g., lenses, planar and/or curved reflective surfaces, etc.) that direct light 22 from light sources 100 to eye box 24. ASTF 44 may be located at location 104 (e.g., interposed on optical path 40 between light sources 100 and optics 102), at location 106 (e.g., interposed on optical path 40 between optics 102 and eye box 24), and/or may be interspersed among optical elements within optics 102. Optics 102 and/or optical path 40 may be free from optical waveguides such as waveguide 26 (e.g., optics 102 and/or optical path may be formed without any optical waveguides for directing light 22 from light sources 100 to eye box 24). In this way, light 22 may be filtered by ASTF 44 and may pass directly to eye box 24 (e.g., without passing through an optical waveguide such as waveguide 26) via optics 102 (e.g., via eye piece optics, planar or curved reflective surfaces, etc.). In examples where optical path 40 includes a reflective spatial light modulator, light 22 may be reflected off of the reflective spatial light modulator and may pass directly to eye box 24 via optics 102 (e.g., where ASTF 44 filters the light before and/or after reflection off of the spatial light modulator).

The foregoing is merely illustrative and various modifications can be made to the described embodiments. The foregoing embodiments may be implemented individually or in any combination.

What is claimed is:

1. A display system comprising:
   a first emissive display panel having pixels configured to emit light within a first wavelength range that propagates along an optical path extending from the first emissive display panel to an eye box, wherein the first wavelength range comprises a red wavelength range;
   a second emissive display panel configured to emit light within a second wavelength range that is different from the first wavelength range, wherein the second wavelength range comprises a green wavelength range;
   a third emissive display panel configured to emit light within a third wavelength range that is different from the first and second wavelength ranges, wherein the third wavelength range comprises a blue wavelength range;
   a first angle-selective transmission filter interposed on the optical path and configured to filter the light emitted by the pixels as a function of angle to produce filtered light;
   a waveguide interposed on the optical path, wherein the first angle-selective transmission filter is configured to remove at least a portion of the light from the optical path before the filtered light is provided to the waveguide;
   an input coupler on the waveguide and configured to couple the filtered light into the waveguide;
   an output coupler on the waveguide and configured to couple the filtered light out of the waveguide and towards an eye box;
   imaging optics between the first emissive display panel and the input coupler;
   a prism between the imaging optics and the first emissive display panel, wherein the first angle-selective transmission filter is between the first emissive display panel and the prism, the first angle-selective transmission filter is configured to transmit the filtered light towards the prism, the prism is configured to transmit the filtered light towards the imaging optics, and the imaging optics is configured to transmit the filtered light towards the input coupler;
   a second angle-selective transmission filter between the second emissive display panel and the prism, wherein the second angle-selective transmission filter is configured to filter the light emitted by the second emissive display panel as a function of angle to produce second filtered light and is configured to transmit the second filtered light to the prism; and
   a third angle-selective transmission filter between the third emissive display panel and the prism, wherein the third angle-selective transmission filter is configured to filter the light emitted by the third emissive display panel as a function of angle to produce third filtered light and is configured to transmit the third filtered light to the prism.

2. The display system of claim 1, wherein the pixels comprise light sources selected from the group consisting of: light-emitting diodes (LEDs), organic light-emitting diodes (OLEDs), micro-light-emitting diodes (uLEDs), and lasers.

3. The display system of claim 1, wherein the first angle-selective transmission filter is configured to transmit an additional portion of the light emitted by the first emissive display panel and is configured to re-direct the portion of the light emitted by the first emissive display panel, wherein the additional portion spans a first set of angles about a normal axis of a lateral surface of the first angle-selective transmission filter, wherein the portion spans a second set of angles about the normal axis, and wherein the second set of angles are farther from the normal axis than the first set of angles.

4. The display system of claim 3, wherein the first angle-selective transmission filter comprises:
   an additional waveguide;
   an absorber on the additional waveguide; and
   diffractive grating structures on the additional waveguide, wherein the diffractive grating structures are configured to diffract the portion of the light towards the absorber via a total internal reflection mode of the additional waveguide.

5. The display system of claim 3, wherein the first angle-selective transmission filter comprises:
   louvered mirror structures configured to reflect the portion of the light away from the waveguide.

6. The display system of claim 3, wherein the first angle-selective transmission filter comprises diffractive grating structures configured to diffract the portion of the light while transmitting the additional portion of the light.

7. The display system of claim 6, wherein the diffractive grating structures comprise grating structures selected from the group consisting of: thin-film holograms, volume holograms, and surface relief gratings.

8. The display system of claim 6, wherein the diffractive grating structures have grating vectors oriented parallel to the normal axis.

9. The display system of claim 6, wherein the diffractive grating structures comprise first, second, and third holograms each configured to diffract light incident at a different respective subset of the second set of angles.

10. The display system of claim 9, wherein the first angle-selective transmission filter comprises a first layer of grating media that includes the first hologram, a second layer of grating media that includes the second hologram, and a third layer of grating media that includes the third hologram.

11. The display system of claim 9, wherein the first angle-selective transmission filter comprises a layer of grating media that includes the first, second, and third holograms, the first, second, and third holograms being superimposed within the same volume of the layer of grating media.

12. The display system of claim 9, wherein the angle-selective transmission filter comprises a layer of grating media that includes the first, second, and third holograms, and wherein the first, second, and third holograms are superimposed within the same volume of the layer of grating media.

13. The display system of claim 6, wherein the diffractive grating structures are configured to diffract the portion of the light at output angles within a light cone associated with the additional portion of the light.

14. The display system of claim 1, wherein the first angle-selective transmission filter comprises:
a first set of diffractive grating structures on a first waveguide; and
a second set of diffractive grating structures on a second waveguide, wherein the first set of diffractive grating structures are configured to diffract the portion of light in a first direction and the second set of diffractive grating structures are configured to direct the portion of light in a second direction that is different than the first direction.

15. The display system of claim 14, wherein the second direction is orthogonal to the first direction.

16. A display system comprising:
an emissive display panel having pixels configured to emit light that propagates along an optical path extending from the emissive display panel to an eye box;
an angle-selective transmission filter interposed on the optical path and configured to filter the light emitted by the pixels as a function of angle to produce filtered light;
a waveguide interposed on the optical path, wherein the angle-selective transmission filter is configured to remove a first portion of the light from the optical path before the filtered light is provided to the waveguide, to transmit a second portion of the light emitted by the emissive display panel, and to re-direct the first portion of the light, wherein the second portion of the light spans a first set of angles about a normal axis of a lateral surface of the angle-selective transmission filter, wherein the first portion of the light spans a second set of angles about the normal axis, wherein the second set of angles are farther from the normal axis than the first set of angles, wherein the angle-selective transmission filter comprises diffractive grating structures configured to diffract the first portion of the light while transmitting the second portion of the light, wherein the diffractive grating structures comprise first, second, and third holograms each configured to diffract light incident at a different respective subset of the second set of angles, and wherein the angle-selective transmission filter comprises a first layer of grating media that includes the first and second holograms and a second layer of grating media that includes the third hologram, the first and second holograms being superimposed within the same volume of the first layer of grating media;
an input coupler on the waveguide and configured to couple the filtered light into the waveguide; and
an output coupler on the waveguide and configured to couple the filtered light out of the waveguide and towards an eye box.

17. The display system of claim 16, further comprising:
imaging optics between the emissive display panel and the input coupler; and
a prism between the imaging optics and the emissive display panel.

18. The display system of claim 17, wherein the angle-selective transmission filter is between the prism and the imaging optics, the angle-selective transmission filter is configured to transmit the filtered light towards the imaging optics, and the imaging optics is configured to transmit the filtered light towards the input coupler.

19. The display system of claim 17, wherein the angle-selective transmission filter is between the imaging optics and the input coupler, the prism and the imaging optics are configured to transmit the light emitted by the pixels towards the angle-selective transmission filter, and the angle-selective transmission filter is configured to transmit the filtered light towards the input coupler.

20. The display system of claim 16, wherein the first, second, and third holograms are each configured to diffract light of a different respective set of wavelengths.

21. A display system comprising:
an emissive display panel having an array of pixels configured to emit light that propagates along an optical path extending from the emissive display panel to an eye box;
a waveguide interposed on the optical path;
an input coupler on the waveguide and configured to couple the light into the waveguide;
an output coupler on the waveguide and configured to couple the light out of the waveguide and towards the eye box; and
diffractive grating structures interposed on the optical path between the emissive display panel and the output coupler, wherein the diffractive grating structures are configured to:
transmit a first portion of the light incident upon the diffractive grating structures over a first range of incident angles, and
diffract, out of the optical path and at output angles within a light cone associated with the first portion of the light, a second portion of the light incident upon the diffractive grating structures over a second range of incident angles, the second range of incident angles being farther from a normal axis of the diffractive grating structures than the first range of incident angles.

22. The display system of claim 21, further comprising:
an absorber, wherein diffracting the second portion of the light at the output angles is configured to direct the second portion of the light towards the absorber; and
an additional waveguide, wherein the diffractive grating structures and the absorber are located on the additional waveguide and wherein the additional waveguide is configured to propagate the second portion of the light diffracted by the diffractive grating structures towards the absorber via total internal reflection.

23. A display system comprising:
an emissive display panel having pixels that emit light;
a waveguide;
imaging optics that direct the light emitted by the emissive display panel towards the waveguide;
an input coupler on the waveguide and configured to couple the light into the waveguide;
an output coupler on the waveguide and configured to couple the light out of the waveguide and towards an eye box; and
an angle-selective transmission filter on the waveguide and overlapping the input coupler, wherein the angle-selective transmission filter comprises an additional waveguide and absorbers on opposing ends of the additional waveguide, and wherein the angle-selective transmission filter is configured to:

transmit, towards the output coupler, a first portion of the light incident upon the angle-selective transmission filter over a first range of incident angles, and re-direct, away from the output coupler and toward the absorbers, a second portion of the light incident upon the angle-selective transmission filter over a second range of incident angles, the second range of incident angles being farther from a normal axis of the angle-selective transmission filter than the first range of incident angles.

24. The display system of claim 23, wherein the additional waveguide is configured to propagate the second portion of the light incident upon the angle-selective transmission filter toward the absorbers via total internal reflection.

* * * * *

UNITED STATES PATENT AND TRADEMARK OFFICE
CERTIFICATE OF CORRECTION

PATENT NO. : 12,298,505 B2
APPLICATION NO. : 17/161469
DATED : May 13, 2025
INVENTOR(S) : Vikrant Bhakta et al.

Page 1 of 1

It is certified that error appears in the above-identified patent and that said Letters Patent is hereby corrected as shown below:

In the Claims

Column 12, Line 65-66, Claim 12 "the angle-selective" should read -- the first angle-selective --.

Signed and Sealed this
First Day of July, 2025

Coke Morgan Stewart
*Acting Director of the United States Patent and Trademark Office*